June 7, 1960 C. E. BRANICK 2,939,678
VERTICALLY EXPANDING TIRE SPREADER
Filed Aug. 20, 1958 4 Sheets-Sheet 1

INVENTOR.
CHARLES E. BRANICK
BY
ATTORNEYS

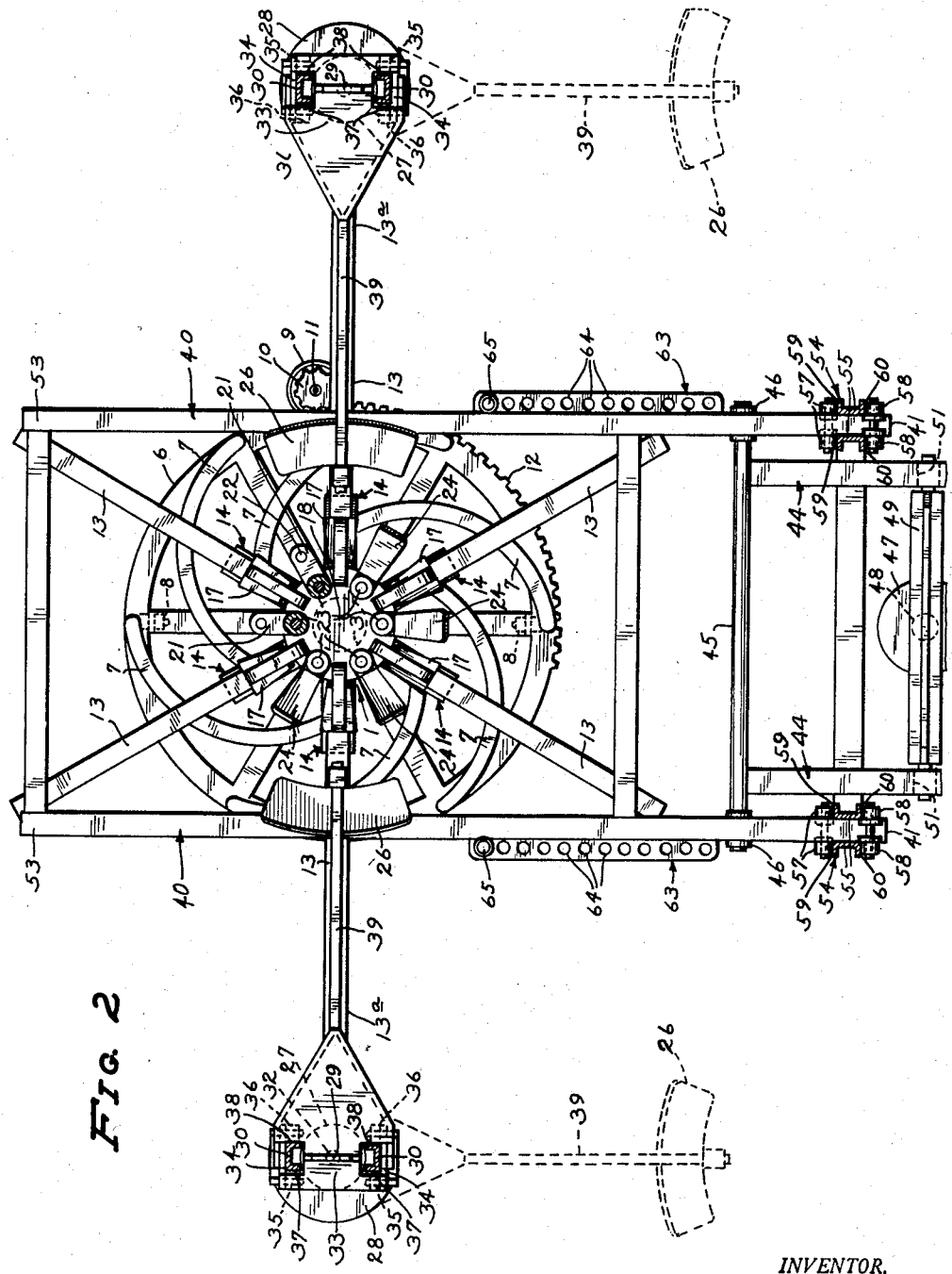

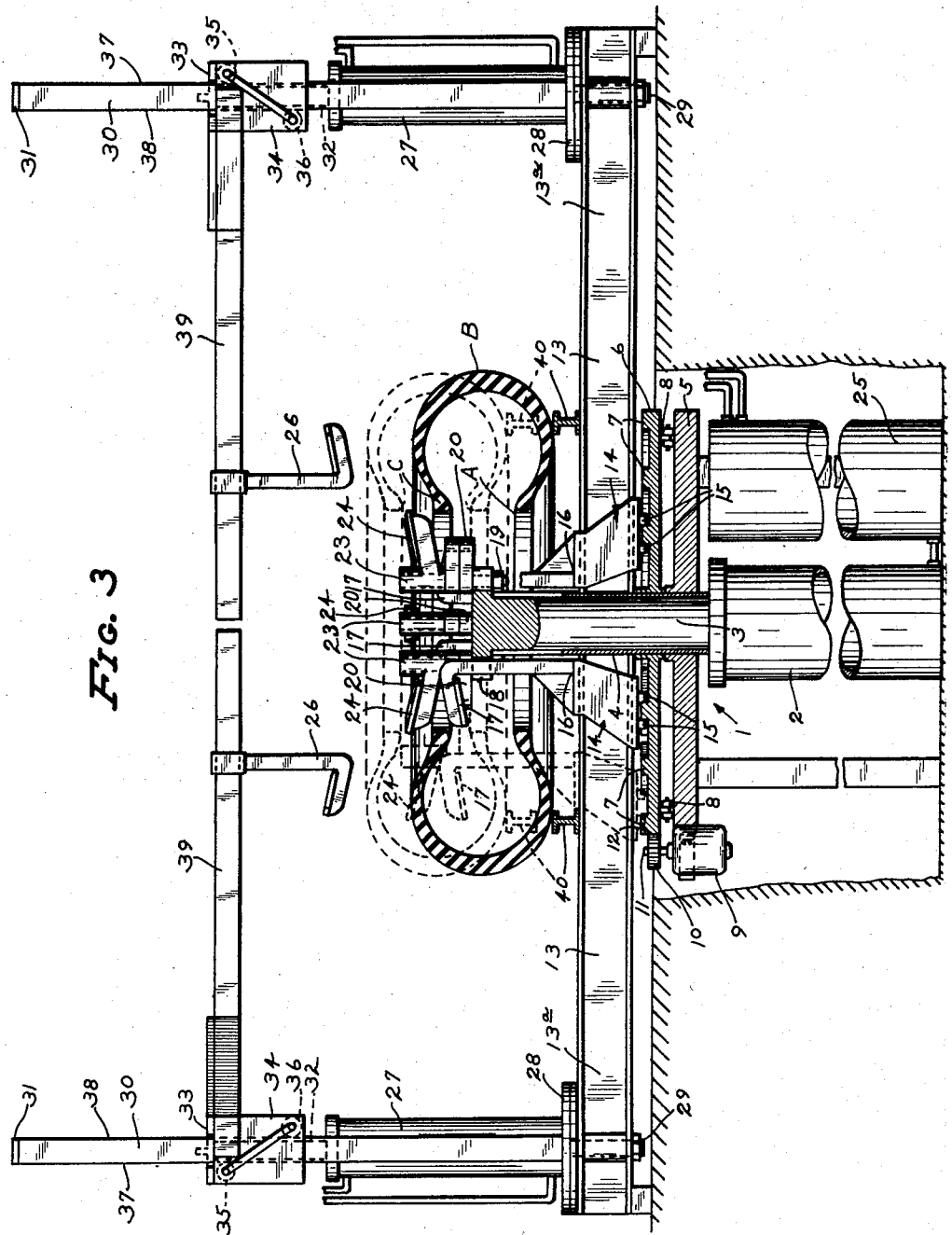

June 7, 1960 C. E. BRANICK 2,939,678
VERTICALLY EXPANDING TIRE SPREADER
Filed Aug. 20, 1958 4 Sheets-Sheet 4
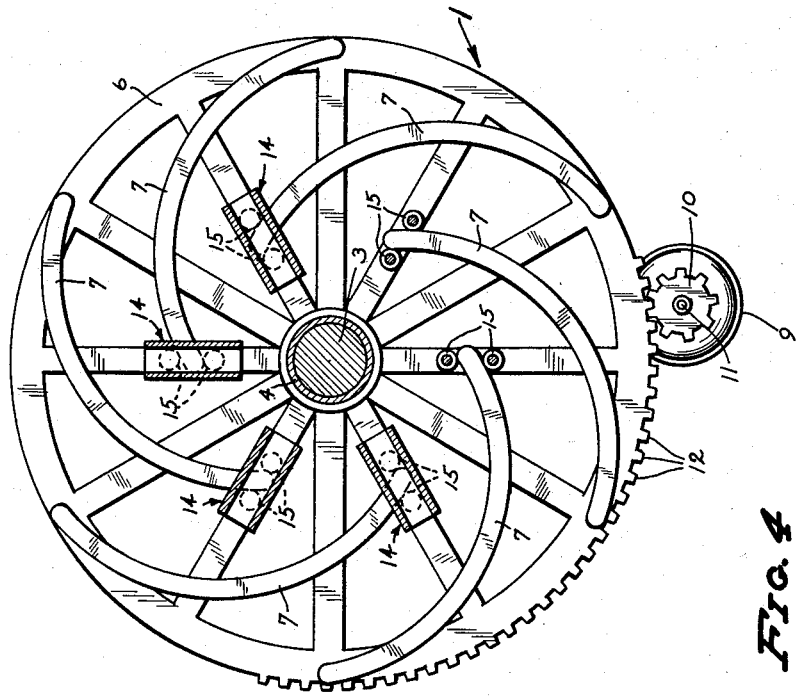
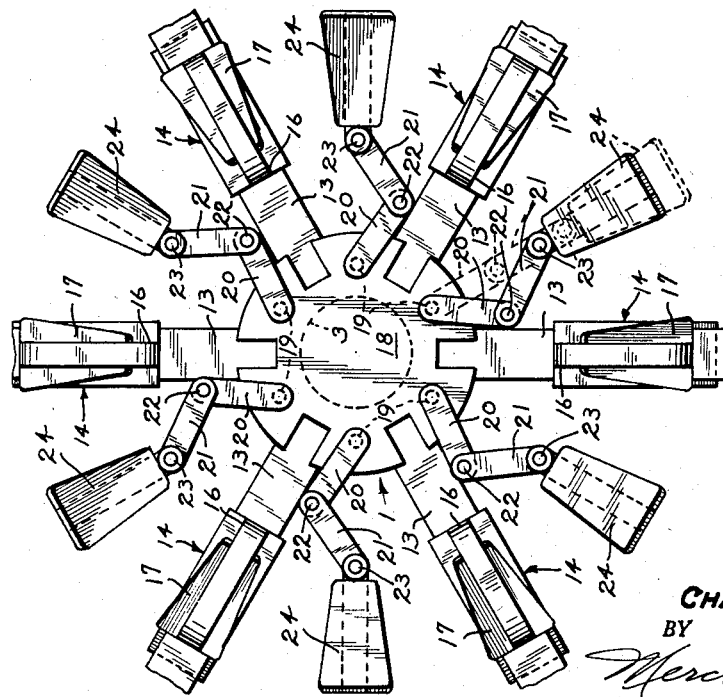
INVENTOR.
CHARLES E. BRANICK
BY
Merchant & Merchant
ATTORNEYS

United States Patent Office 2,939,678
Patented June 7, 1960

2,939,678

VERTICALLY EXPANDING TIRE SPREADER

Charles E. Branick, Branick Mfg. Co., P.O. Box 1937, Fargo, N. Dak.

Filed Aug. 20, 1958, Ser. No. 756,230

9 Claims. (Cl. 254—50.3)

My invention relates generally to the art of pneumatic tire spreaders and more particularly to power operated devices of this character.

In this art, there are two distinct types of tire spreaders utilizing a plurality of circumferentially spaced hooks which engage and spread apart the opposed beads of a pneumatic tire. One such type is illustrated by my Patent 1,908,311, wherein the bead-engaging hooks engageable with the outer bead of a tire are associated with spreader arms which project through the opening defined by the beads of a pneumatic tire. Such spreaders are particularly useful in contracting the circumference of a tire to permit the same to be entered into or removed from a so-called band type endless tire retreading matrix. This type of device is obviously not suitable, however, for the inserting of an air bag or the like into the tire casing when the beads are spread apart in view of the fact that said spreader arms constitute a barrier. The other type of tire spreader is illustrated by my Patent 1,943,784, wherein the hooks engageable with the outer bead are associated with arms which extend around the exterior of the casing, said exterior spreader arms obviously prohibiting the use of the device to insert tires within band type retreading matrixes but leaving the interior of the casing free for positioning of air bags therein.

The primary object of my invention is the provision of a tire spreader having only one set of bead-engaging hooks for the engagement of the inner bead but having both inside and outside hook-equipped spreader arms for selective engagement with the outer bead of a tire and which therefore may be used in a retreading operation both for the insertion of an air bag within the tire casing and placing thereover of a band type tire spreader.

A further object of my invention is the provision of a device of the class above described which is provided with a novel and highly useful tire lifting device which may be used to lower a tire casing carried thereby into a horizontal position concentric to said spreader arms.

A further object of my invention is the provision of a device of the class described which is not unduly expensive to produce and which is rugged and durable in construction.

A still further object of my invention is the provision of device of the type immediately above described which incorporates a minimum of working parts and requires but a minimum of skill to operate.

The above and still further objects of my invention will become apparent from the following detailed specification, appended claims and attached drawings.

Referring to the drawings wherein like characters indicate like parts throughout the several views:

Fig. 2 is a view in top plan;

Fig. 3 is a view partly in end elevation and partly in vertical section, some parts being broken away and some parts shown in section, the lower spreader arms being shown in a retracted position;

Fig. 4 is an enlarged view partly in horizontal section and partly in top plan as seen substantially from the line 4—4 of Fig. 1; and Fig. 5 is an enlarged view in top plan of the lower pair of spreader arms, showing said arms in their extended positions.

Figure 1:
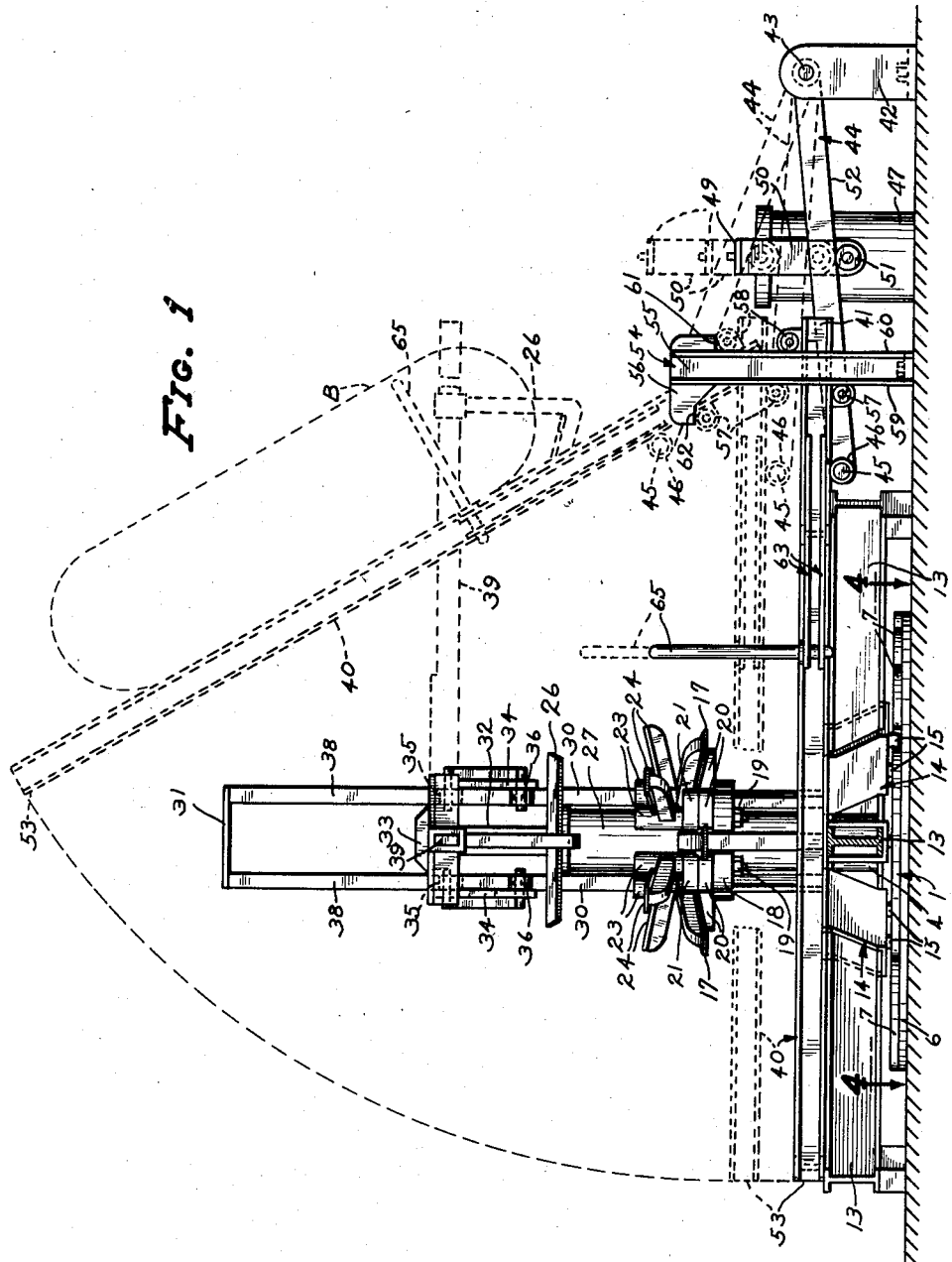
Fig. 1 is a view in side elevation of my novel structure, some parts being broken away and some parts shown in section.

Referring with greater particularity to the drawings, the numeral 1 indicates in its entirety supporting structure including an upstanding piston-equipped cylinder 2 (preferably and as shown adapted to be positioned below the level of a floor or the like), and a plunger 3 projecting upwardly from the cylinder 2. Carried by the cylinder 2 and slidably receiving the plunger 3 is an elongated guide sleeve 4. Rigidly secured to the guide sleeve 4 in overlying relationship to the cylinder 2 is a horizontally disposed mounting plate 5. Immediately overlying the mounting plate 5 and journaled for rotation on the guide sleeve 4 is a rotary member 6 which, as shown particularly in Figs. 2 and 4, has a plurality of circumferentially spaced upstanding cam elements 7, shown as being in the nature of segmental ribs. As shown by Fig. 3, the rotary member 6 is provided with rollers 8 which engage the mounting plate 5. To impart rotary movements to the rotary member 6, for a purpose which will hereinafter be explained in detail, I preferably provide an electric motor 9 fast on the peripheral edge of the mounting plate 5 and having a toothed drive wheel 10 on its vertically disposed shaft 11. As shown particularly in Fig. 4, the toothed drive wheel 10 meshes with the segmental toothed peripheral edge 12 of the rotary member 6.

Rigidly secured to the guide sleeve 4 in overlying relationship to the rotary member 6 are a plurality of circumferentially spaced radially projecting arms 13, a diametrically opposed pair which have extended outer end portions identified by the numeral 13a. Slide members, identified in their entireties by the numeral 14, are mounted one each on a different one of the arms 13 for longitudinal movements. Each of the slide members 14 is provided with a pair of longitudinally spaced depending roller elements 15 each pair of which engages an opposite side of one of the segmental cam-acting ribs 7. At this point it should be clear that rotation of the rotary member 6, through the medium of the motor 9, drive wheel 10 and toothed peripheral edge 12, causes radially inner or radially outer movements of the slide members 14 upon their respective arms 13. Mounted fast to the upper surface of the slide members 14, as indicated at 16, are a plurality of hooks 17 one each carried by a different one of said slide members 14 for common movements therewith. The hooks 17 are adapted to engage the lower bead A of a pneumatic tire casing B concentrically positioned with respect to the hooks 17 in the horizontal position shown in Fig. 3; and the sliding movements of the slide members 14 on their respective radial arms 13 impart retracting and extending movements thereto.

As shown particularly in Fig. 3, the extended upper end of the plunger 3 is diametrically enlarged to form a head 18. Pivotally secured to the head 18 on vertical axes, as indicated at 19, are a plurality of circumferentially spaced inner links 20. The inner links 20 are pivotally secured at their opposite ends to the inner ends of outer links 21, as indicated at 22. Pivotally secured, as at 23, to the extended outer ends of outer links 21 are hook elements 24 adapted to engage the upper bead C of the tire casing B.

It will be noted that the plunger 3 and the head 18 carried thereby, as well as the links 21 and hooks 24 carried thereby, project through the opening defined by the beads A, C. To impart spreading movements to the tire casing A for the purpose of reducing the same in diameter to place thereon or remove therefrom a band-type retreading matrix, not shown, the lower hooks 17 are caused to engage the lower head A of the tire B, as immediately below described; whereas the upper hooks 24 are caused to engage the upper bead C by moving the hooks and toggle links 20, 21 from the full line toward the dotted line position of Fig. 5. Finally, spreading movements are imparted to the casing by moving the plunger 3 in an upward direction by imparting fluid under pressure into the cylinder 2 from a storage tank or the like 25.

When it is desired to utilize my novel structure for the purpose of spreading the beads A, C, apart to place an air bag or the like therein or remove same therefrom, I retract the hooks 24 from the upper bead C by buckling the toggle links 20, 21, while retaining the lower hooks 17 in engagement with the lower bead A and the diametrically opposed pair of hooks 26 are caused to engage the upper bead C in a manner now to be described.

The extended ends of opposed radially projecting arms 13a have mounted thereon, as indicated particularly in Figs. 2 and 3, upstanding fluid pressure operated cylinders 27 each of which is mounted upon a rotary plate 28 for rotation on vertical axes as indicated at 29. Rigidly secured to the rotary plates 28 and projecting upwardly on opposite sides of each of the cylinders 27 is a pair of guide elements in the nature of rails 30. The rails 30 are connected together at their upper ends by a transverse strap 31. Projecting upwardly from the cylinders 27 are plunger rods 32 which have crossheads 33 at their upper ends. The crossheads 33 are connected at their opposite ends to carriages 34 having laterally spaced pairs of upper and lower roller elements 35 and 36 which respectively engage opposite side surfaces 37 and 38 of their respective guide rails 30.

Rigidly secured to each of the carriages 34 and projecting radially outwardly therefrom in a horizontal plane are spreader arms 39. Longitudinally slideable upon the spreader arms 39 are said hooks 26.

By means of the mechanism immediately above described, it will be obvious that the carriages 34 and spreader arms and hooks 39 and 26 respectively carried by each thereof may be raised and lowered as desired for placing the hooks 26 into operative engagement with the upper bead C, or conversely removing said hooks therefrom, as well as for imparting spreading movements to the tire casing B while permitting access to the interior of the casing for the purpose of inserting or removing an air bag or the like.

When the spreader arms 39 and hooks 26 carried thereby are not in use, they may be angularly disposed from the full line operative position of Fig. 3 by swinging same to the dotted line position of Fig. 2 on the vertical axes 29.

On opposite sides of the cylinder 2 and the upper and lower spreader hooks 17, 24 are a pair of generally parallel lifting arms 40. In rearwardly spaced relation to the rear ends 41 of the arms 40 is a standard 42. Pivotally secured at one end to the standard 42, as indicated at 43, is a bifurcated lifting lever 44, the forward end 45 of which is provided with laterally spaced roller elements 46 one each of which underlies one of the rear end portions of the lifting arms 40 in forwardly spaced relationship to the extreme rear ends 41 thereof. For the purpose of imparting raising and lowering movements to the lifting lever 44, I provide a conventional fluid pressure operated cylinder 47, the plunger 48 of which is provided with a crosshead 49 having depending straps 50. The lower ends of the straps 50, as shown in Fig. 1, are provided with laterally outwardly projecting rollers 51 which underlie the intermediate portion of the bifurcated lifting lever 44 and engage and ride upon the undersurface 52.

For the purpose of imparting limited vertical movements to the lifting arms 40 from the full to the dotted line positions of Fig. 1 and for imparting upward swinging movements of the forward ends 53 thereof from the full to the dotted line positions of Fig. 1, I provide the following mechanism: a pair of leg elements 54, secured to suitable supporting structure, project upwardly one each adjacent the rear end portion of one of the lifting arms 40. As shown particularly in Fig. 1, the leg elements 54 are positioned intermediate the roller elements 46 carried by the lifting lever 44 and the extreme rear ends 41 of said lifting arms 40. Furthermore, each of the leg elements 54 comprises a pair of channel irons 55, one on each opposite side of one of the lifting arms 40. The upper ends of each of the cooperating pairs of channel irons 55 are connected together by heads 56. Rigidly secured to and carried by the rear end portions of each of the lifting arms 40 are a pair of horizontally and vertically spaced rollers 57 and 58, the former of which depend from their respective lifting arms 40 and normally engage the forward surfaces 59 of their adjacent leg elements 54 and the latter of which project upwardly from their respective lifting arms 40 and engage the rear vertical surfaces 60 of their respective leg elements 54.

The lower surfaces of the heads 56 define rear and front stop shoulders 61 and 62 the former of which overlie and engage their cooperating upstanding roller elements 58 when the lifting arms 40 reach the horizontal dotted line position of Fig. 1. Obviously at this point, the forward ends 53 of the lifting arms 40 commence the swinging movement which terminates in the dotted line position of Fig. 1 when the depending rollers 57 carried by the lifting arms 40 engage the stop shoulders 62 which overlie them. It will be noted that the stop shoulders 62 are elevated with respect to the stop shoulders 61 so as to increase the extent of upward movements of the lifting arms 40.

It will be noted particularly with reference to Fig. 2, that the intermediate portion of each of the lifting arms 40 is provided with indexing bars 63 each having longitudinally spaced openings 64 therein for the reception of fingers 65. The fingers 65 are adapted to engage the road-engaging tread of a tire casing B placed on the lifting arms 40, as indicated in Fig. 1, and define an adjustable cradle for the proper positioning of said tire casing B whereby the same may be concentrically positioned with respect to the upper and lower spreader hooks 17, 24 when the lifting arms are lowered to their full line position of Fig. 1.

My invention has been thoroughly tested and found to be completely satisfactory for the accomplishment of the above objects and while I have shown a preferred embodiment thereof I wish it to be specifically understood that same is capable of modification without departure from the scope and spirit of the appended claims.

What I claim is:

1. In a device of the class described, supporting structure, a pair of cooperating tire bead engaging spreader devices mounted on said supporting structure for relative movements of one thereof toward and away from the other thereof in a generally vertical direction, a pair of laterally spaced generally parallel tire lifting arms one each on an opposite side of said spreader devices, means adjacent one end of said lifting arms mounting and guiding said arms for limited vertical movements while maintaining same in a horizontal plane and for tilting movements about a horizontal axis at one limit of said vertical movement, and means for imparting raising and lowering movements to said arms, said means comprising a lever pivotally mounted to said arms and supporting structure on parallel axes, and power operated mechanism coupled to said lever in spaced relation to the pivotal connections thereof.

2. In a device of the class described, supporting structure, a pair of cooperating tire bead engaging spreader devices mounted on said supporting structure for relative movements of one thereof toward and away from the other thereof in a generally vertical direction, a pair of laterally spaced generally parallel tire lifting arms one each on an opposite side of said spreader devices, means adjacent one end of said lifting arms mounting and guiding said arms for limited vertical movements in a horizontal plane below the level of said spreader devices and for tilting movements about a horizontal axis at the upper limit of said vertical movement whereby the free ends of said arms are raised above the level of said spreader devices, and means for imparting raising and lowering movements to said arms, said means comprising a lever pivotally mounted to said arms and supporting structure on parallel axes, and power operated mechanism coupled to said lever in spaced relation to the pivotal connections thereof.

3. The structure defined in claim 2 in further combination with means carried by said arms for supporting a tire on said arms from the tilted position of said arms during lowering movements thereof and disposing the tire in concentric relation to said spreader devices when said tire supporting arms are horizontally disposed.

4. The structure defined in claim 3 in which said last-mentioned means comprises a plurality of longitudinally adjustable tire tread engaging fingers on the arms which define a cradle for the tire therebetween, said arms each defining a plurality of longitudinally spaced recesses for selective reception of said fingers whereby to accommodate tires of different diameters.

5. The structure defined in claim 2 in which said mounting and guiding means comprises a pair of laterally spaced upstanding leg elements having parallel front and rear surfaces, a pair of horizontally and vertically spaced rollers on each of said arms, the upper roller on each arm engaging the rear surface of its respective leg, the lower one of said rollers on each arm engaging the front surface on its adjacent leg, stop elements on the rear surfaces of said legs for engagement with said rollers to initiate upward swinging movements of said arms, and means limiting said upward movements of said arms.

6. In a device of the class described, supporting structure, a vertically disposed fluid operated piston and cylinder having an upstanding plunger, said supporting structure including a horizontally disposed mounting plate overlying said cylinder and having a central aperture through which said plunger extends, a guide sleeve slidably receiving said plunger in overlying relation to said mounting plate, said supporting structure further including a plurality of circumferentially spaced arms secured to said guide sleeve and extending radially outwardly therefrom, a plurality of slide members one each carried by a different one of said arms for movements toward and away from said plunger, a plurality of hooks one each carried by a different one of said slide members for common movements therewith and adapted to engage the lower bead of a horizontally disposed pneumatic tire casing received on said supporting structure, a rotary member interposed between said mounting plate and said arms for rotation on the axis of said plunger, a plurality of cam elements on said rotary member, each of the slide members having cam followers engaging respective ones of said cams whereby said slide members are moved in opposite directions on said radial arms upon rotation of said rotary member in opposite directions to move said bead-engaging hooks into and out of tire bead engaging positions, means for imparting rotation to said rotary member, a plurality of upper tire bead-engaging hooks, and means mounting said upper tire bead-engaging hooks on the upper end portion of said plunger for movements generally radially thereof into and out of engagement with the upper bead of said tire.

7. The structure defined in claim 6 in which the means for imparting rotation to the rotary member comprises a segmental gear tooth portion on said rotary member, a toothed drive pinion engaged therewith and a motor for imparting rotation to said drive pinion.

8. The structure defined in claim 6 in which said upper tire bead-engaging hook mounting means comprises a plurality of pairs of toggle arms each pair pivotally connected at its outer end to a respective one of said upper tire bead-engaging hooks, the inner end of each pair of said toggle links being pivotally connected to said plunger rod.

9. The structure defined in claim 6 in further combination with a plurality of vertically disposed guide elements on said supporting structure in circumferentially spaced relationship about the axis of said plunger and radially outwardly of said tire casing, a plurality of spreader arms one each mounted on a different one of said guide elements for vertical movements thereon and for swinging movements between operative positions wherein said spreader arms extend radially toward the axis of said plunger and inoperative positions angularly displaced from said operative position, and a plurality of spreader hooks one each depending from a different one of said spreader arms and longitudinally slideable thereon, said last-mentioned hooks being adapted to be moved into engagement with the upper bead of said tire when said spreader arms are moved to their operative positions, and means for raising and lowering said spreader arms independently of said plunger, whereby the upper bead of said tire may be moved to a spread apart relationship with respect to the lower bead thereof by said last-mentioned hooks or said plunger mounted hooks selectively.

References Cited in the file of this patent

UNITED STATES PATENTS

| | | |
|---|---|---|
| 1,848,961 | Manley | Mar. 8, 1932 |
| 2,477,858 | Brabbin | Aug. 2, 1949 |
| 2,634,095 | Branick | Apr. 7, 1953 |
| 2,665,108 | Branick | Jan. 5, 1954 |